United States Patent [19]

Long et al.

[11] 4,288,926

[45] Sep. 15, 1981

[54] LONGITUDINAL RAIL PROFILOMETER

[75] Inventors: Lennart E. Long, Waltham, Mass.; Roger K. Steele, Pueblo, Colo.; David F. Coleman, West Medford; Ralph A. Gustafson, Norton, both of Mass.

[73] Assignee: The United States of America as represented by the Secretary of Transportation, Washington, D.C.

[21] Appl. No.: 90,744

[22] Filed: Nov. 2, 1979

[51] Int. Cl.³ ............................ G01B 5/20; G01B 5/28
[52] U.S. Cl. .................................. 33/174 P; 33/1 Q; 33/144
[58] Field of Search ...................... 33/174 P, 121, 122, 33/124, 144, 1 Q, 174 L

[56] References Cited

U.S. PATENT DOCUMENTS 1,417,703 5/1922 Waffenschmidt ..................... 33/1 Q
4,069,590 1/1978 Effinger ................................ 33/1 Q

FOREIGN PATENT DOCUMENTS 1098532 2/1961 Fed. Rep. of Germany .... 33/174 P

Primary Examiner—Willis Little
Attorney, Agent, or Firm—Herbert E. Farmer; Harold P. Deeley, Jr.

[57] ABSTRACT

Portable apparatus for use in measuring vertical deviation of the surface of a rail from a reference plane. The measuring device includes a pair of guide beams and a hand-powered carriage which move along the beams. A sensor, which follows undulations resulting from rail wear, is mounted on the carriage and is coupled to the pen of a recorder.

7 Claims, 3 Drawing Figures

LONGITUDINAL RAIL PROFILOMETER

ORIGIN OF THE INVENTION

The invention described herein was made in the course of, or under, a contract with the U.S. Department of Transportation and may be manufactured and used by or for the Government for governmental purposes without the payment of any royalties thereon or therefor.

BACKGROUND OF THE INVENTION

1. Field of the Invention

The present invention relates to measuring the geometry, especially the surface contour, of elongated members and particularly to the detection of undulatory wear of rails. More specifically, this invention is directed to a portable instrument for detecting corrugations in the surface of a railhead. Accordingly, the general objects of the present invention are to provide novel and improved methods and apparatus of such character.

2. Description of the Prior Art

While not limited thereto in its utility, the present invention is particularly well suited for the measurement, in the field where external power sources are not available, of the undulatory wear of the rails of a railrod track. The need for measurement of rail geometry, and particularly uneven railhead surface wear, has long been recognized. U.S. Pat. No. 4,075,888 to Buhler contains a discussion of the need for such undulatory wear measurement.

Presently available devices for use in rail surface contour measurement are exemplified by above-mentioned U.S. Pat. No. 4,075,888. These wear measurement devices are typically mounted on some form of supporting platform which continuously moves along the rail. This continuous motion results in the platform being subjected to the very condition which the measuring device is intended to gauge. Accordingly, the wear measurement devices available prior to the present invention have been characterized by considerable complexity incident to attempts to compensate for the track induced movements of the platform on which the measuring device was mounted. This apparatus complexity, in turn, greatly increases the cost of the equipment and also increases the level of skill required of the operator while simultaneously diminishing the reliability of the measuring equipment.

A further deficiency of prior art surface wear measuring devices has resided in an inherent inability to relocate the device on the rail in precisely the same longitudinal position where a previous measurement was performed. Thus, in actual practice, the prior art apparatus had the capability of making a measurement only in a single vertically oriented plane extending through the railhead.

SUMMARY OF THE INVENTION

The present invention comprises a method of and apparatus for measuring undulatory wear of rails. Apparatus in accordance with the invention includes a portable housing adapted to be manually positioned on the head of a rail to be tested. The housing comprises a pair of parallel reference beams which cooperate to define a reference plane against which vertical deviations of the rail surface may be compared. A carriage, which supports a rail contacting sensor and a strip-type recorder, is movable along the reference beams. Vertical movements of the sensor during such longitudinal carriage movement will be converted into amplified motion of the recorder pen. In a preferred embodiment the carriage is moved along the reference beams by means of a hand crank and trolley wires and the recording strip will be simultaneously driven. The recording medium will preferably be advanced at a rate which provides for compression of the longitudinal movement of the carriage.

The housing of a measurement instrument in accordance with the present invention is, in accordance with a preferred embodiment, held in position on the railroad track railhead by means of magnets. Also in accordance with a preferred embodiment of the invention, a mechanical calibration step or steps is provided at one limit of travel of the movable carriage whereby the recorder pen will, at one end of a trace, be driven in a step or steps commensurate with vertical deviation of known magnitude. Also, the sensor in accordance with a preferred embodiment of the invention may be adjusted laterally with respect to the railhead to a plurality of positions whereby, with a single positioning of the housing, multiple parallel traces may be recorded.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
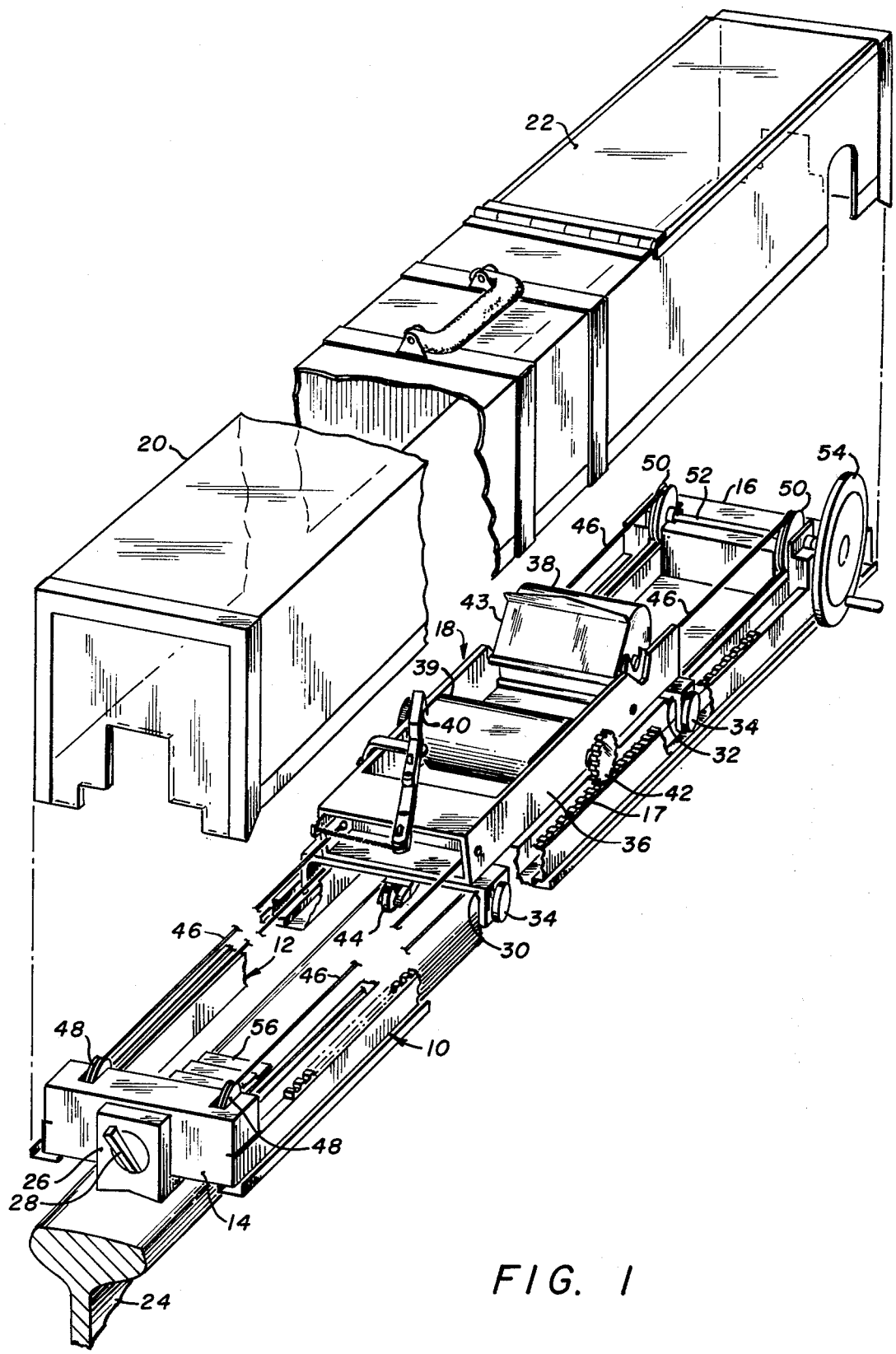
FIG. 1 is a perspective view, partly in section, of a preferred embodiment of a longitudinal rail profilometer in accordance with the present invention.
Figure 2:
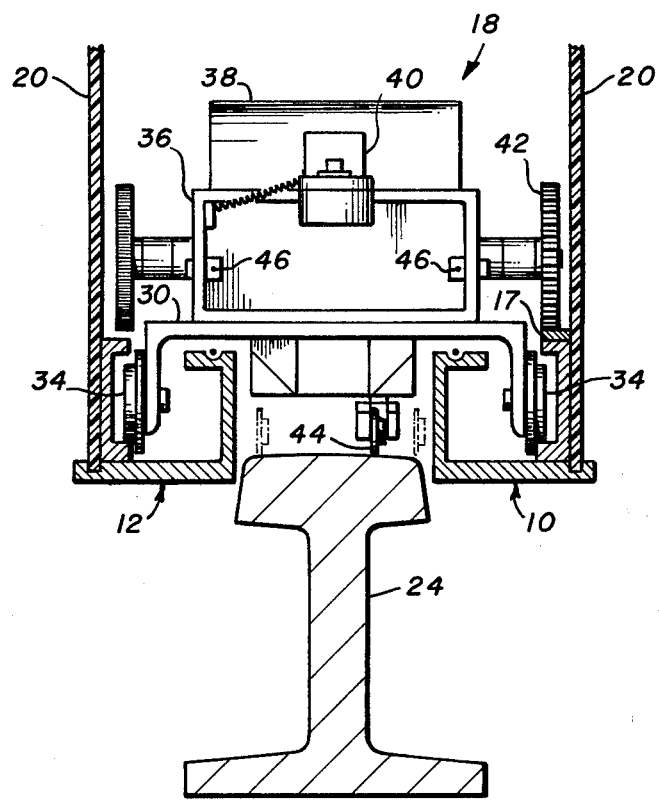
FIG. 2 is a cross-sectional, front elevation view of the apparatus of FIG. 1.

With reference to the drawing, and particularly to FIG. 1, a rail profilometer in accordance with the present invention includes a pair of parallel reference beams indicated generally at 10 and 12. Reference beams 10 and 12 will typically be from one to two meters in length and the parallelism thereof will be insured by means of transversely extending end members 14 and 16 which interconnect the beams. The reference beams may be extruded aluminum elements which, as may be seen by joint consideration of FIGS. 1 and 2, define guide slots or channels. The floors of these channels will define a reference plane. A drive gear rack 16 is affixed to a top portion of beam 10 in any suitable manner. The purpose of rack 16 will be described below.

The other principal components of a profilometer in accordance with the disclosed embodiment of the present invention are a sensor-recorder carriage, indicated generally at 18, and a removable cover 20. Cover 20 will typically be comprised of a transparent plastic material and will be provided with a handle by which the entire profilometer may be carried; the apparatus of the present invention being portable and needing no external power sources. The cover 20 of the disclosed embodiment is provided with an access door 22 in the upper surface thereof. The provision of door 22 permits paper record tapes to be removed and new tapes to be installed in the sensor-recorder carriage 18 without dismantling cover 20 from the reference plane defining means which includes the beams 10 and 12.

Continuing to refer to FIG. 1, when in use the profilometer is positioned on the head of a rail, such as rail 24, as shown. The measuring instrument is supported on the rail by means of a pair of feet, only one of which 26 is shown, which extend below end members 14 and 16. The feet 26 each establish two lines of contact with the railhead; the bottom surfaces of feet 26 being provided with an inverted V-shaped groove as shown. Feet 26 include magnetic clamps. On-off type controls, such as control 28, are provided whereby the railhead may be selectively included in the magnetic circuit of the magnets to thereby hold the profilometer firmly in place on the rail. If deemed necessary or desirable, height adjustment bolts, not shown, may be provided to allow adjustment of the vertical spacing between feet 26 and end members 14 and 16.

The sensor-recorder carriage 18 is longitudinally movable with respect to rail 24 along beams 10 and 12. The carriage is comprised of a pair of generally U-shaped members 30 and 32 which span the gap between beams 10 and 12. The legs of members 30 and 32 extend downwardly into the channels defined by beams 10 and 12. A roller 34 is rotatably mounted to each of the legs of each of members 30 and 32, adjacent the free ends of the legs, whereby carriage 18 is supported from the floors of the channels in beams 10 and 12 by means of these rollers 34. The members 30 and 32 are connected, and longitudinally spaced, by a frame 36 which serves as the housing for the recording mechanism and a rail contacting sensor.

Continuing with a discussion of sensor-recorder carriage 18, a moving strip type recorder is mounted on frame 36. The recorder includes a feed roll for a paper tape 38 and a take-up spool, not shown, for the tape. As it moves between the feed roll and take-up spool, the tape will pass over a writing surface and will present an upwardly facing surface which may be marked by a roller-type pen or stylus 40. The take-up reel for the tape is driven by a gear 42 which engages the rack 16 on the top of beam 10. Thus, movement of the sensor-recorder carriage 18 along the reference beams 10 and 12 on rollers 34 will result in the recording medium being advanced past pen 40. Gear 42 may be selected, if deemed necessary or desirable, to provide a compression of the information being recorded whereby the length of the tape on which a trace is made will be shorter than the amount of movement along the rail 24 of the sensor-recorder carriage 18. A tape cutter 43 is provided adjacent the feed roll for tape 38.

The pen 40 is pivotally mounted whereby the tip thereof is free to move laterally with respect to the direction of movement of the tape on which information is being recorded. Movement is imparted to pen 40 by means of coupling the pen, in the conventional manner, to a railhead contacting sensor or follower 44. Contact sensor 44 will follow corrugations in the railhead resulting from the wear thereof; i.e., sensor 44 is free to move vertically as carriage 18 moves along beams 10 and 12; and these vertical sensor movements are translated into lateral movements of the tip of pen 40 relative to the moving tape. The lateral position of sensor 44 may be varied, so as to permit a plurality of parallel measurement of the same section of rail, by means of a rail follower (sensor) positioning arm, not shown, which is coupled to the support arm which bears sensor 44. The positioning arm is selectively engaged in slots in a cross member, also not shown, carried by carriage 18. This cross member extends transversely with respect to the direction of motion of carriage 18, defines a guide groove for the sensor positioning arm and has a plurality of vertically extending teeth which define the above-mentioned slots. By spring loading the positioning arm into selected slots between these teeth, the lateral position of sensor 44 may be varied by the operator.

Figure 3:
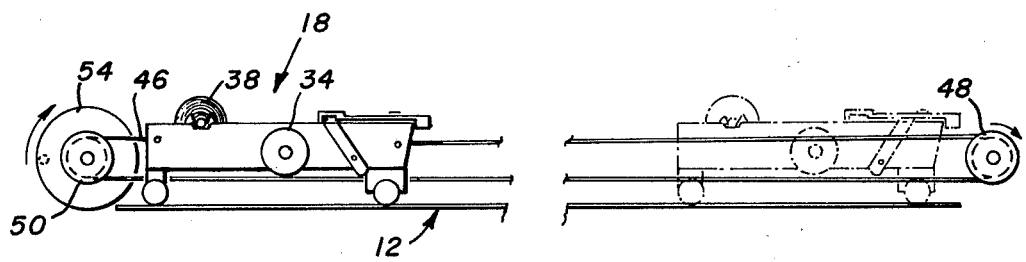
FIG. 3 is a schematic illustration depicting the means for driving the movable carriage of the apparatus of FIG. 1.

Referring now jointly to FIGS. 1 and 3, the sensor-recorder carriage 18 is attached to a pair of trolley wires or cables 46. The cables 46 define, by the attachment of the ends thereof to frame 36, continuous loops. Each of cables 46 passes over pulleys mounted for rotation in the end members 14 and 16. The pulley pairs mounted in end members 14 and 16 are respectively indicated at 48 and 50. The pulleys 50 mounted in end member 16 are keyed or otherwise locked to a shaft 52 which extends out through a slot in case 20. A hand wheel 54 is attached to the outwardly disposed end of shaft 52. Because of frictional engagement of the cables 46 with pulleys 50, rotation of hand wheel 54 will result in the sensor-recorder carriage moving along the beams 10 and 12. As noted above, during this movement the cooperation between gear 42 and rack 16 will result in tape 38 moving relative to pen 40 whereby a permanent record may be made of the movements of the track contacting sensor 44.

The contact sensor 44 may be caused to climb one or more calibrated steps at a point adjacent one limit of movement of the carriage 18 whereby a reference trace, which may be compared with any wear related undulations of the rail surface, will be produced. This may, for example, be accomplished by providing an elevation calibration plate 56 which extends outwardly from end member 14. The plate 56 will have a wedge-shaped leading edge over which sensor 44 runs to provide absolute calibration.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for measuring wear related undulations in a rail comprising:

means defining a reference plane comprising a pair of parallel beams, and a pair of transverse end members inter-connecting said beams adjacent the ends thereof;

sensor-recorder means mounted for movement on said beams comprising:

a movable rail contacting sensor, said sensor following undulations of a rail during movement of said sensor-recorder means along said beams, the movements of said sensor being relative to the plane defined by said reference plane defining means;

recorder means;

means coupled to said sensor for producing signals commensurate with vertical movements of said sensor and delivering said signals to said recorder means;

carriage means supported on said beams by roller means, said carriage means in turn supporting said sensor means, said recorder means and said signal producing means; and means for imparting motion to said sensor-recorder means comprising:

at least a first pair of pulleys, said pulleys of said pair mounted at spacially displaced points on said reference plane defining means;

elongated drive means passing around said pulleys, said drive means being flexible and being secured at opposite ends to said sensor-recorder means; and means for manually rotating one of said pulleys to cause said sensor-recorder means to move along said beams between said displaced points.

2. The apparatus of claim 1 further comprising:

reference signal generating means mounted on said reference plane defining means, said reference signal generating means imparting a known amount of vertical movement to said sensor at a first limit of travel thereof.

3. Apparatus for measuring wear related undulations in a rail comprising:

means defining a reference plane comprising a pair of parallel beams;

a pair of transverse end members inter-connecting said beams adjacent the ends thereof; and locating feel means, said feel means extending from said end members and supporting said aparatus on a test rail with said beams being disposed at opposite sides of the rail;

sensor-recorder means mounted for movement on said beams comprising:

a movable rail contacting sensor, said sensor following undulations of a rail during movement of said sensor-recorder means along said beams, the movements of said sensor being relative to the plane defined by said reference plane defining means;

means coupled to said sensor for producing signals commensurate with vertical movements of said sensor and delivering said signals to said recorder means;

carriage means supported on said beams by roller means, said carriage means in turn supporting said sensor means, said recorder means and said signal producing means; and means for imparting motion to said sensor-recorder means comprising:

at least a first pair of pulleys mounted from said reference plane defining means for rotation about axes which are generally parallel to the reference plane;

flexible elongated drive means, said drive means being engaged by said pulleys and being secured at a pair of opposite ends to said carriage means; and means for imparting motion to at least one of said pulleys.

4. The apparatus of claim 3 wherein said feet means include means for magnetically coupling said reference plane defining means to a test rail.

5. The apparatus of claim 4 wherein said recorder means comprises:

means providing a movable recording medium; and means for marking said medium, said marking means being operatively connected to said signal producing means.

6. The apparatus of claim 5 further comprising:

first gear means mounted on one of said beams;

second gear means rotatedly mounted on said carriage means, said second gear means engaging said first gear means whereby movement of said carriage along said beams will cause rotation of said second gear means; and means coupling said second gear means to said recording medium providing means whereby the recording medium will be moved relative to said marking means as a result of movement of said carriage.

7. The apparatus of claim 6 further comprising:

reference signal generating means mounted on said reference plane defining means, said reference signal generating means imparting a known amount of vertical movement to said sensor at a first limit of travel thereof.

* * * * *